United States Patent [19]

Trahan et al.

[11] Patent Number: 5,257,414
[45] Date of Patent: Oct. 26, 1993

[54] APPARATUS FOR ACCEPTING AND RETAINING A MEMORY CARD

[75] Inventors: David W. Trahan, Palatine; John F. Roje, Glen Ellyn; Robert J. Stinauer, Arlington Heights, all of Ill.

[73] Assignee: Motorola, Inc., Schaumburg, Ill.

[21] Appl. No.: 618,125

[22] Filed: Nov. 26, 1990

[51] Int. Cl.[5] .......................... H04B 1/08; H04B 1/38; G06K 7/04
[52] U.S. Cl. .................................. 455/90; 455/185.1; 455/348; 379/357; 235/441; 235/486
[58] Field of Search ................. 379/355, 356, 357, 58, 379/59, 60, 63; 235/441, 486; 455/89, 90, 186.1, 185.1, 348

[56] References Cited

U.S. PATENT DOCUMENTS

| | | | |
|---|---|---|---|
| 4,142,312 | 3/1979 | Stokes | 379/58 |
| 4,724,310 | 2/1988 | Shimamura et al. | 235/486 |
| 4,743,746 | 5/1988 | Murschall et al. | 235/441 |
| 4,780,604 | 10/1988 | Hasegawa et al. | 235/441 |
| 4,876,552 | 10/1989 | Zakman | 455/89 |
| 4,931,991 | 6/1990 | Cvijanovich | 235/441 |
| 4,965,821 | 10/1990 | Bishop et al. | 379/58 |
| 5,099,512 | 3/1992 | Shigami et al. | 379/357 |

FOREIGN PATENT DOCUMENTS

| | | |
|---|---|---|
| 0214478A2 | 8/1986 | European Pat. Off. . |
| 0276403 | 11/1986 | European Pat. Off. ............. 379/58 |
| 0316700A1 | 7/1988 | European Pat. Off. . |
| 0282296A2 | 10/1988 | European Pat. Off. . |
| 0378727 | 7/1990 | European Pat. Off. ............. 379/357 |
| 2587549A1 | 9/1985 | France . |

OTHER PUBLICATIONS

ITT ElectroMechanical Components Worldwide. Brochure containing their range of Smart Card Connectors. This brochure describes the available range of smart card connectors from ITT.
Amphenol Industrial Technology Division. Brochure containing various chip card readers.
Amphenol Industrial Technology Division. Catalogue containing Amphenol's range of chip card readers.

Primary Examiner—Reinhard J. Eisenzopf
Assistant Examiner—Lisa Charouel
Attorney, Agent, or Firm—Kirk W. Dailey; Rolland R. Hackbart

[57] ABSTRACT

The present disclosure includes a discussion of a Subscriber Identification Module (SIM) chip card reader (201). In the preferred embodiment, the SIM chip card reader is integrated into and sealed to a radiotelephone. A battery (105) for the radiotelephone (103) retains the SIM chip card (401) in the SIM chip card reader (201) while the radiotelephone (103) is operating. The SIM chip card reader (201) also includes a ejector knob (405) for removing the SIM chip card (401) from the SIM chip card reader (201).

13 Claims, 3 Drawing Sheets

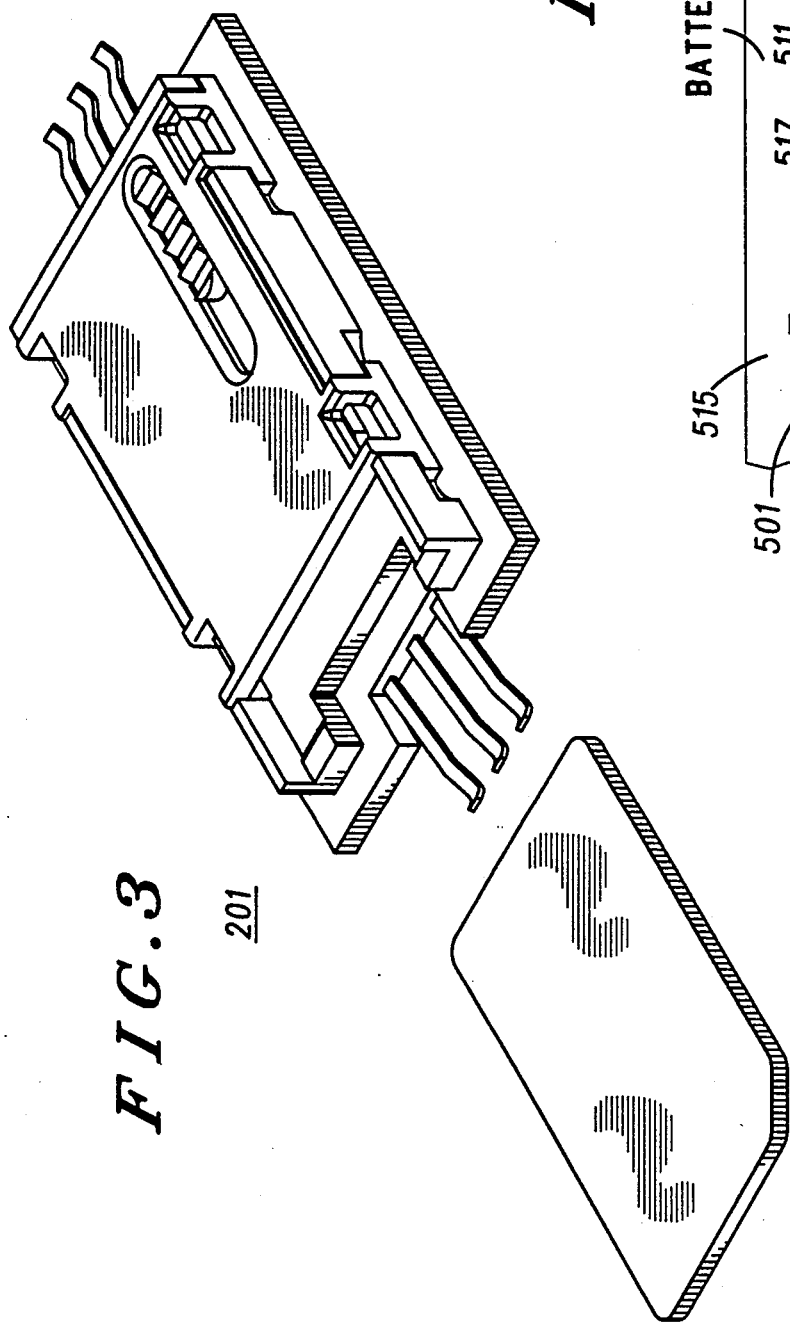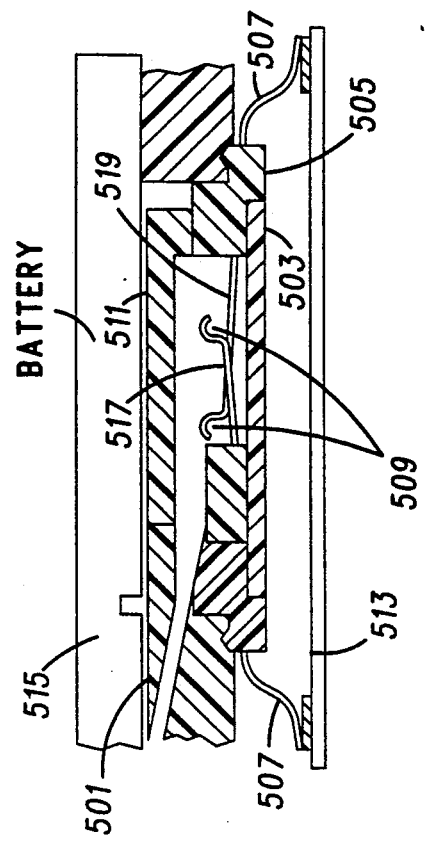

APPARATUS FOR ACCEPTING AND RETAINING A MEMORY CARD

FIELD OF THE INVENTION

This invention relates generally to an electronic retention apparatus for accepting memory cards and making electrical contact between the memory card and another electronic device and more specifically to a radio telephone containing an integrated electronic retention apparatus enabling an external memory card to make electrical contact to an internal data processing device.

BACKGROUND OF THE INVENTION

Generally, the type of apparatus described herein is referred to as a card reader and which typically conforms to International Standards Organization (ISO) document #7816-2:1988 (E), Technical Committee ISO/TC 97, Information Processing Systems, May 15, 1988, First Edition. Traditional designs for card readers include an open slot design and a hinged design.

The open slot card reader design is easy to operate and resilient to many card insertion-cycles. The process of loading the card into the reading position is accomplished by sliding the card into the open slot. The card remains partially exposed so the card can be removed by pulling the card out of the slot; no complicated ejector is necessary. However, if the card reader is subjected to excessive vibrations or shock, the card has a potential of being jarred loose and being lost. The contacts do not come into physical contact with the card until the card is fully inserted into the open slot, allowing the process to be highly repeatable. These contacts require the card reader to be wider than if the card reader were to use a less reliable stationary contact. With the card removed, the open slot of the card reader exposes the internal electronic components of the electronic apparatus to the outside elements, potentially causing damage from water or moisture.

The hinged card reader is more difficult to operate than the open slot card reader, however, it protects the card from being lost and it is resilient to card insertion-cycles. This card reader must be opened prior to inserting or removing the card, requiring room for the hinged device to swing open. Once the card is loaded, it is protected from being jarred loose, since it is locked into the electronic device. The hinged card reader uses contacts similar to the open slot design allowing the card reader to be resilient to many insertion-cycles. However, the use of a hinge in a portable radio telephone risks the hinged part breaking off of the card reader or the malfunction of the spring contained within the hinge, which could render the apparatus useless.

Although the above examples are well suited to their applications, in a portable radio telephone a need exists for a card reader to meet at least the following characteristics: (1) physically small, (2) environmentally sealed, (3) simply designed, and (4) durable.

BRIEF DESCRIPTION OF THE DRAWINGS

FIG. 3 is an isometric drawing of the SIM chip card reader separated from the portable radio telephone.

FIG. 5 is a cross-sectional view of the SIM chip card reader integrated into the radio-telephone and employing the present invention.

DESCRIPTION OF A PREFERRED EMBODIMENT

Figure 1:
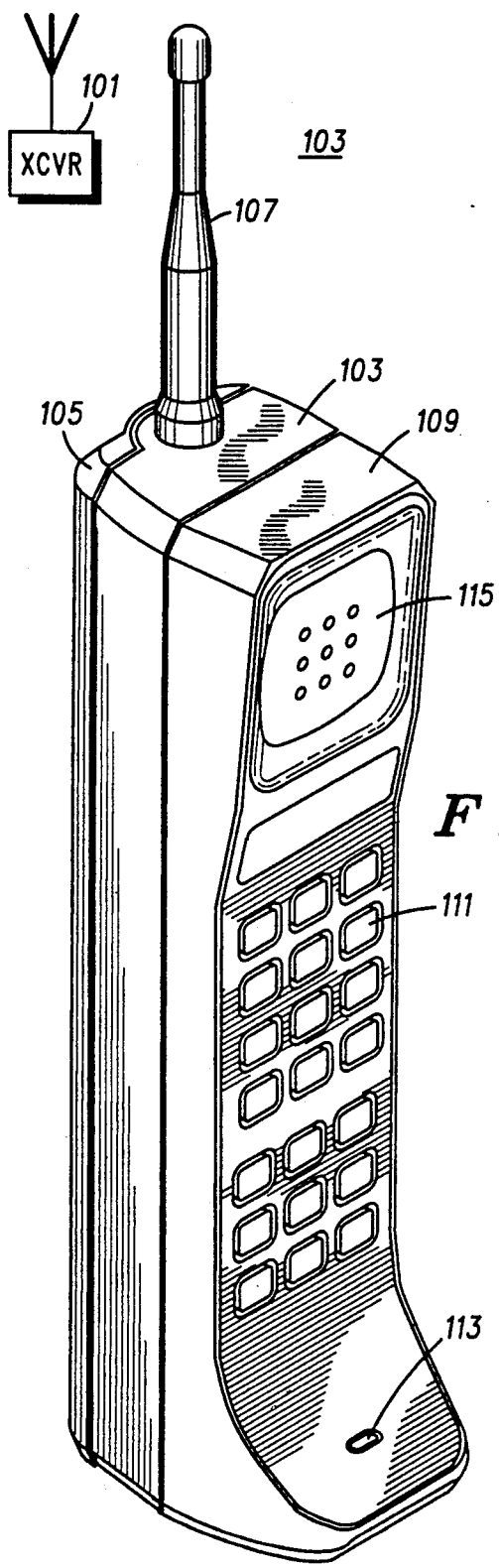
FIG. 1 is a portable radio telephone which may utilize the present invention.

A radio telephone system conveying data signals between a conventional fixed site transceiver 101 and the portable transceiver 103 is shown in FIG. 1. The portable transceiver may be located in a portable radio telephone such as a Model #PR092-01 available from Motorola, Inc. A portable radio telephone includes a portable transceiver 103, a battery pack 105, an antenna 107 and a user interface module 109. The portable transceiver 103 is responsible for receiving and transmitting the signal between the fixed site transceiver 101 and itself. In addition, it is responsible for verifying the subscriber's identification for billing purposes. The battery pack 105 is a detachable rechargeable power source used to power the electronics contained in the portable transceiver 103 and the user interface module 109. The antenna 107 transmits signals to and receives signals from a fixed site transceiver 101. The antenna's length is a convenient fraction of a wavelength in order to provide nearly optimum radiation of energy. The user interface module 109 contains the keypad 111, the mouthpiece 113, and the ear piece 115.

Figure 2:
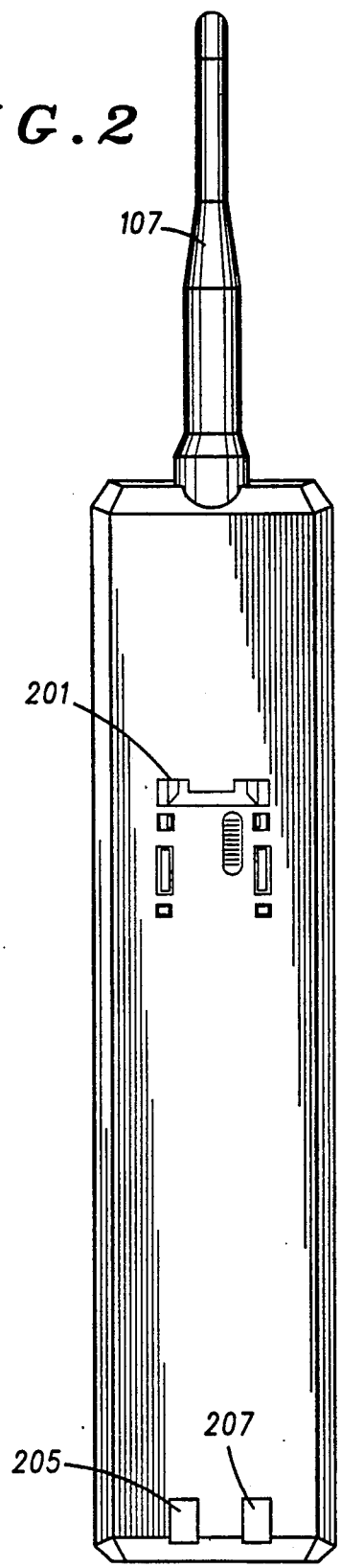
FIG. 2 is a back side view of the portable radio telephone shown in FIG. 1 with its battery pack removed to reveal the Subscriber Identification Module (SIM) chip card reader.

FIG. 2 depicts the portable transceiver 103 from backside of the phone with the battery pack 105 removed. This exposes the battery pack power terminals 205, 207 and the subscriber identification module (SIM) chip card reader 201. When the battery pack 105 is attached it serves three purposes: First, it supplies power to the portable transceiver. Second, it protects the SIM chip card reader 201 from the external environment, such as the rain or dust. Third, if the SIM chip card 401 was jarred loose from the SIM chip card reader 201, the battery pack 105 would confine the SIM chip card 401 to the area between the battery pack 105 and the back of the portable transceiver 103.

Figure 4:
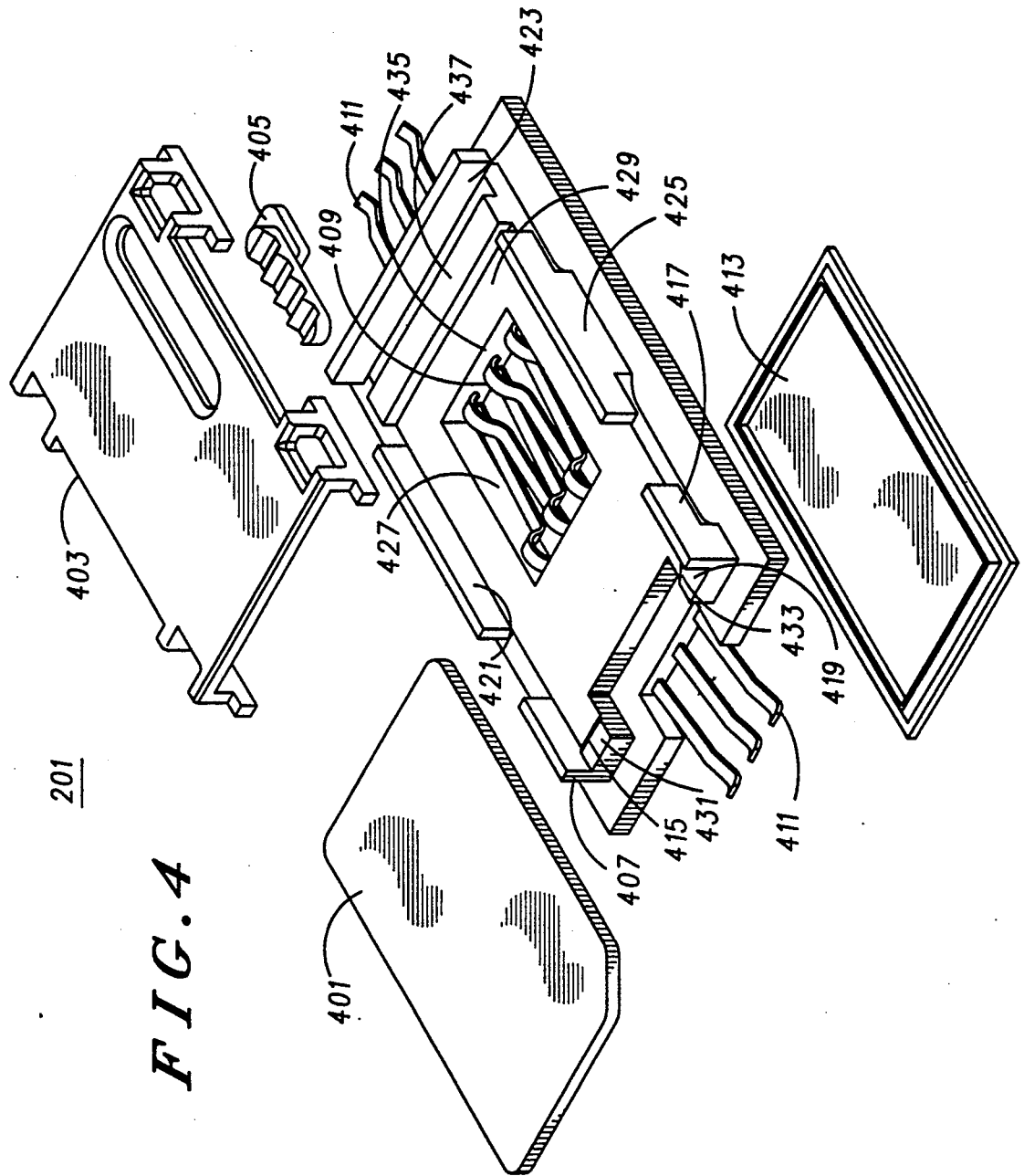
FIG. 4 is an exploded view of the SIM chip card reader employing the present invention and revealing the SIM chip card reader's individual parts.

An exploded view revealing the individual parts of the SIM chip card reader 201 is shown in FIG. 4. The assembly comprises a base cover 413, an ejector knob 405, six sliding electrical contacts 409, six spring electrical contacts 411, a card reader base 407 and a contact cover 403. The contact cover 403 features may be molded as part of the structural housing of the portable transceiver 501. The only moveable part of the SIM chip card reader 201 being the ejector knob 405.

A SIM chip card chamber is formed by the combination of the card reader base 407, and the contact cover 403 interlocked to the card reader base 407. The card reader base 407 contains a center cut out area 427, three interlocking walls 421, 423, 425 surrounding a retention area 429 raised from and parallel to the card reader base 407. The insides of the three interlocking walls 421, 423, 425 form the outer boundaries of the retention area 429. The retention area 429 also contains two inclined planes 415, 417 and a raised triangular shaped polarizer 419. The triangular shaped polarizer 419 is disposed in a corner 431 nearest the open end of the SIM chip card chamber. The triangular shaped polarizer 419 insures that the SIM chip card 401 has been inserted on the proper side and in the proper direction. The first inclined plane 417 is disposed in the other corner 433 nearest the open end of the SIM chip card chamber. The second inclined plane 415 is disposed on the edge of the triangular shaped polarizer 419 that faces inside the SIM chip card chamber. These inclined planes 415, 417 together with the three interlocked walls 421, 423, 425 create a retention area 429 which is formed to the size and shape of the SIM chip card 401, where the SIM chip card 401 will rest when it has been properly aligned. The two inclined planes 415, 417 function as ejection ramps when a user moves the ejector knob 405 towards the inclined planes 415, 417.

The aforementioned center cut out area 427, disposed within the retention area 429, contains the sliding contacts 409 which are coupled to the SIM chip card 401 when it is aligned. Each arm 517 of the contacts extends parallel to the retention area 429 and from the side of the cut out area 427. The arm 517 is then coupled to an n-shaped member 509, with a curved portion of the n-shaped member 519 extending into the retention area 429, thereby forming a sliding contact 409. Each of the six adjacent sliding contacts 409 protrude from opposite sides 435, 437 of the center cut out area 427. The base cover 413 is sonically welded to the card reader base 407, providing a complete cover between the internal portable transceiver housing 501 and the SIM chip card chamber.

Each sliding contact 409 is connected to a corresponding spring contact 411 inside of the transceiver housing 501. The body of the connector between the sliding contact 409 and the spring contact 411 is injection molded into the card reader base 505. The spring contact 411 protrudes from a side portion of the card reader base 505 which is located inside the transceiver housing at an angle from the plane of the transceiver housing 501, then the spring contact is coupled to a u-shaped member 519. A part of the u-shaped member 519 is tangent to the PC board 513 located inside of the transceiver housing 501, thereby forming a spring contact 411.

FIG. 5 shows a cross-sectional view of the SIM chip card reader 201 integrated into the portable radio-telephone. The card reader base 505 is sonically welded to the inside of the transceiver housing 501. When the battery pack 515 is attached to the back side of the portable transceiver 103 it shelters the SIM chip card reader 201 from the external elements. Should the SIM chip card 401 jar loose from the SIM chip card reader 201, the battery pack 515 confines the SIM chip card 401 within the area between the battery pack 515 and the transceiver housing 501. Since the card reader base 505 is sonically welded to the interior of the transceiver housing 501, the body of the electrical connectors are injected molded into the card reader base 505 and the base cover 413 is sonically welded to the card reader base 505, the interior of the transceiver housing 501 is environmentally sealed from the SIM chip card chamber external to the transceiver housing 501. The u-shaped members of the spring contacts 507 are compressed against the PC board 513. This compression eliminates the need for the contacts to be welded or coupled to the PC board 513 in any other manner and it also reduces the precision necessary in aligning the PC board 513 and the spring contacts 507 during the manufacturing process.

A detailed sketch of the fully assembled SIM chip card reader 201 is shown in FIG. 3. The SIM chip card reader 201 is used as an interface providing electrical connections between a SIM chip card 401 containing subscriber information and electronics internal to the portable transceiver 103. The SIM chip card 401 must be aligned within the SIM chip card reader 201 in order to obtain the information from the SIM chip card 401. The SIM chip card 401 is aligned with the sliding contacts 409 contained within the SIM chip card chamber when the SIM chip card 401 is slid into the opening of the SIM chip card chamber, over the two inclined planes 415, 417 and into the retention area 429. Here, the SIM chip card 401 will be retained until it is ejected by the user. The SIM chip card 401 is retained by a combination of the retention area 429 and the force of the sliding contacts 409 against the contact cover 403. Once the SIM chip card 401 is retained in this position, the sliding contacts 409 are coupled to the SIM chip card 401 contacts, allowing the portable transceiver 103 access to the information stored within the SIM chip card 401. The electrical operation of obtaining the information of the SIM chip card 401 is described in International Standards Organization (ISO) Document #7816-3: 1988 (E), Technical Committee ISO/TC 97, Information Processing Systems, May 15, 1988 First Edition.

The user may eject the SIM chip card 401 any time after it has been properly aligned. Upon aligning the SIM chip card 401, the ejector knob 405 is moved by the SIM chip card 401 along the base of the SIM chip card chamber away from the inclined planes 415, 417. A user can move the ejector knob 405 towards the inclined planes 415, 417 to eject the SIM chip card 401 from the SIM chip card chamber.

What is claimed is:

1. A memory card reader having at least a first electrical contact electrically coupled to an electronic apparatus disposed within an interior of a structural housing, the memory card reader accepting a memory card having at least a second electrical contact disposed on the memory card and information stored in the memory card, the memory card reader comprising:

a memory card chamber for aligning the first electrical contact with the second electrical contact upon loading the memory card into the memory card reader, such that the information stored on the memory card is readable, the memory card chamber comprising:

a planar first platform coupled to an interior surface of the structural housing, a planar second platform raised from the plane of, disposed within, joined to and parallel to said planar first platform, an opening essentially in the center of said planar second platform surrounding a first end of the first electrical contact, a first inclined plane disposed at a first edge of said planar second platform, a planar third platform raised from the plane of, joined to, and parallel to said planar second platform, said planar third platform being triangular in shape, disposed in a first corner formed by said first edge and a second edge of said planar second platform, said second edge adjacent to and perpendicular to said first edge, a second inclined plane disposed at a third edge of said planar second platform, said third edge created by said planar third platform, a fourth platform raised from the plane of, joined to, and perpendicular to said planar first platform, disposed parallel to said second edge of said planar second platform, a fifth platform raised from the plane of, joined to, and perpendicular to said planar first platform, disposed parallel to a fourth edge of said planar second platform, said fourth edge opposite said second edge of said planar second platform, a sixth platform raised from the plane of, joined to, and perpendicular to said planar first platform, disposed parallel to a fifth edge of said planar second platform, said fifth edge adjacent to said second and fourth edges and opposite said first edge of said planar second platform, and a first cover raised from the plane of and parallel to said planar first platform, interlocked to said fourth, fifth and sixth platforms;

means for retaining the alignment of the first electrical contact with the second electrical contact;

means for sealing the interior of the structural housing from the memory card reader.

2. A memory card reader in accordance with claim 1 wherein said means for sealing the memory card reader further comprises said first planar platform coupled to the interior of the structural housing and the first electrical contact partially disposed within said first planar platform, the first planar platform forming a seal between the electronic apparatus within the structural housing and said memory card chamber.

3. A memory card reader in accordance with claim 1 wherein said means for retaining the memory card further comprises the first electrical contact providing frictional forces against the memory card, and said memory card chamber providing an area the size and shape of the memory card for the memory card to lay.

4. A card reader integrated into a housing which contains an electronic apparatus and electrically coupling to the electronic apparatus contained within the housing, the card reader comprising:

a first electrical contact having a first end and a second end, said first end disposed within said card chamber, contacting a card, and through which information stored in said card is accessed, and said second end disposed inside the housing which contains the electronic apparatus and coupled to the electronic apparatus; and a base having said first electrical contact partially imbedded therein, the base comprising;

a planar first platform, a planar second platform and a planar third platform, said planar first platform coupled to an interior surface of the housing and having a portion of said first electrical contact imbedded therein, said planar second platform raised from the plane of, disposed within, joined to and parallel to said planar first platform, said planar third platform raised from the plane of, joined to, and parallel to said planar second platform, said planar third platform having a triangular shape, disposed in a first corner formed by a first edge and a second edge of said planar second platform, said second edge adjacent and perpendicular to said first edge, an opening essentially in the center of said planar second platform and surrounding said first end of said first electrical contact, a first inclined plane disposed at a first edge of said planar second platform, and a second inclined plane disposed at a third edge of said planar second platform, said third edge formed by said planar third platform;

a card chamber external to the housing, a cover and said base forming said card chamber; and a sealing member securing said base to the housing which contains the electronic apparatus.

5. A card reader in accordance with claim 4 wherein said first end of said at least a first electrical contact, further comprises an arm which extends above and parallel to said planar first platform and contained within said opening, said arm coupled to an n-shaped member with a curved portion of the n-shaped member extending above the planar second platform, said arm and said n-shaped member thereby forming a sliding contact.

6. A card reader in accordance with claim 4 wherein said second end of said at least a first electrical contact further comprises an arm which extends from a first side of said planar first platform at an angle, said arm coupled to a u-shaped member, a portion of said u-shaped member being parallel to said planar first platform, said arm and said u-shaped member thereby forming a spring contact.

7. A portable radio telephone including a transceiver having a housing and obtaining subscriber information from a Subscriber Identification Module (SIM) chip card coupled to an electronic apparatus contained within the transceiver, the portable radio telephone comprising;

a SIM chip card reader integrally disposed in and sealed to a first side of the housing of the transceiver, said SIM chip card reader comprising;

a SIM chip card chamber having an opening external to the housing of the transceiver, at least a first electrical contact partially imbedded in said SIM chip card reader, the first electrical contact having a first end and a second end, said first end of said first electrical contact disposed within said SIM chip card chamber and coupled to the SIM chip card, said second end of said first electrical contact coupled to the electronic apparatus contained within the transceiver, a planar first platform, a planar second platform and a planar third platform, said planar first platform coupled to the interior of the transceiver housing, said planar second platform raised from the plane of, disposed within, joined to and parallel to said planar first platform, said planar third platform raised from the plane of, joined to, and parallel to said planar second platform, said planar third platform having a triangular shape and disposed in a first corner formed by a first edge and a second edge of said planar second platform, said second edge adjacent and perpendicular to said first edge, an opening essentially in the center of said planar second platform and surrounding said first end of said first electrical contact, a first inclined plane disposed at a first edge of said planar second platform, a second inclined plane disposed at a third edge of said planar second platform, said third edge formed by said planar third platform, a fourth platform raised from the plane of, joined to, and perpendicular to said planar first platform, disposed parallel to said second edge of said planar second platform, a fifth platform raised from the plane of, joined to, and perpendicular to said planar first platform, disposed parallel to fourth edge of said planar second platform, said fourth edge opposite said second edge of said planar second platform, a sixth platform raised from the plane of, joined to, and perpendicular to said planar first platform, disposed parallel to a fifth edge of said planar second platform, said fifth edge adjacent to said second and fourth edges and opposite said first edge of said planar second platform, and a first cover raised from the plane of and parallel to said planar first platform, interlocked to said fourth, fifth and sixth platforms; and a removeable battery pack coupled to said first side of the housing of the transceiver, sheltering said SIM chip card chamber and confining the SIM chip card within the portable radio telephone.

8. A portable radio telephone in accordance with claim 7 wherein said first end of the first electrical contact further comprises an arm which extends above and parallel to said first planar platform and contained within an opening essentially in the center of said planar second platform, said arm coupled to an n-shaped member with a curved portion of said n-shaped member extending above said planar second platform, said arm and said n-shaped member thereby forming a sliding contact.

9. A portable radio telephone in accordance with claim 7 wherein said second end of each of the first electrical contact further comprises an arm which extends from a first side of said planar first platform at an angle, said arm coupled to a u-shaped member, a portion of said u-shaped member being parallel to said planar first platform, said arm and said u-shaped member thereby forming a spring contact.

10. A memory card reader having at least a first electrical contact electrically coupled to an electronic apparatus disposed within an interior of a structural housing, the memory card reader accepting a memory card having at least a second electrical contact disposed on the memory card and information stored in the memory card, the memory card reader comprising:

a memory card chamber for aligning the first electrical contact with the second electrical contact upon loading the memory card into the memory card reader, such that the information stored on the memory card is readable, the memory card chamber comprising:

a planar first platform coupled to an interior surface of the structural housing, a planar second platform raised from the plane of, disposed within, joined to and parallel to said planar first platform, an opening essentially in the center of said planar second platform surrounding a first end of the first electrical contact, a first inclined plane disposed at a first edge of said planar second platform, a planar third platform raised from the plane of, joined to, and parallel to said planar second platform, said planar third platform being triangular in shape, disposed in a first corner formed by said first edge and a second edge of said planar second platform, said second edge adjacent to and perpendicular to said first edge, a second inclined plane disposed at a third edge of said planar second platform, said third edge created by said planar third platform, a fourth platform raised from the plane of, joined to, and perpendicular to said planar first platform, disposed parallel to said second edge of said planar second platform, a fifth platform raised from the plane of, joined to, and perpendicular to said planar first platform, disposed parallel to a fourth edge of said planar second platform, said fourth edge opposite said second edge of said planar second platform, a sixth platform raised from the plane of, joined to, and perpendicular to said planar first platform, disposed parallel to a fifth edge of said planar second platform, said fifth edge adjacent to said second and fourth edges and opposite said first edge of said planar second platform, and a first cover having an oblong slot, said cover raised from the plane of and parallel to said planar first platform, interlocked to said fourth, fifth and sixth platforms, thereby forming said card chamber;

means for retaining said alignment of the first electrical contact with the second electrical contact;

means for sealing the interior of the structural housing from the memory card reader; and means for ejecting the memory card from the memory card reader.

11. A memory card reader in accordance with claim 10 wherein said means for sealing the memory card reader further comprises said first planar platform coupled to the interior of the structural housing and the first electrical contact partially disposed within said first planar platform, the first planar platform forming a seal between the electronic apparatus within the structural housing and said memory card chamber.

12. A memory card reader in accordance with claim 10 wherein said means for retaining the memory card further comprises the first electrical contact providing frictional forces against the memory card, and said memory card chamber providing an area the size and shape of the memory card for the memory card to lay.

13. A memory card reader in accordance with claim 10 wherein said means for ejecting further comprises:

a base joined to a shoulder which protrudes from said oblong slot of said first cover and restricted in motion to a first and a second direction, said first direction towards said sixth platform and opposite said second direction;

sliding said base joined to said shoulder along said second platform in said first direction upon loading the memory card into the memory card reader; and moving said shoulder which protrudes from said oblong slot of said first cover in said second direction causing said base to move the memory card in said second direction.

* * * * *